(12) United States Patent
Wang (10) Patent No.: US 8,444,049 B2
(45) Date of Patent: May 21, 2013

(54) PRECISELY LOCATING AND ADDRESS CONFIRMING METHOD

(75) Inventor: Minliang Wang, Zhangjiagang (CN)

(73) Assignee: Baosheng Technology Ltd., ZhangJiagang ( * ) Notice: Subject to any disclaimer, the term of this patent is extended or adjusted under 35 U.S.C. 154(b) by 0 days.

(21) Appl. No.: 13/497,254

(22) PCT Filed: Dec. 16, 2010

(86) PCT No.: PCT/CN2010/002056
§ 371 (c)(1),
(2), (4) Date: Mar. 21, 2012

(87) PCT Pub. No.: WO2011/075946
PCT Pub. Date: Jun. 30, 2011

(65) Prior Publication Data
US 2012/0175414 A1    Jul. 12, 2012

(30) Foreign Application Priority Data

Dec. 21, 2009    (CN) .......................... 2009 1 0242937

(51) Int. Cl.
*G06F 17/00* (2006.01)
*G06F 19/00* (2006.01)
*G06K 7/10* (2006.01)

(52) U.S. Cl.
USPC ...... 235/375; 235/383; 235/385; 235/462.01; 235/462.08; 235/462.14

(58) Field of Classification Search
USPC ............... 235/375, 383, 385, 462.01, 462.14, 235/462.08
See application file for complete search history.

(56) References Cited

U.S. PATENT DOCUMENTS

| | | | |
|---|---|---|---|
| 5,249,904 A * | 10/1993 | Wakita et al. | 414/282 |
| 5,362,197 A * | 11/1994 | Rigling | 414/807 |
| 7,004,392 B2 * | 2/2006 | Mehlberg et al. | 235/462.01 |
| 2002/0145034 A1* | 10/2002 | Shimada et al. | 235/375 |
| 2005/0067490 A1* | 3/2005 | Fletcher | 235/383 |
| 2005/0095094 A1* | 5/2005 | Maynard et al. | 414/280 |
| 2005/0230470 A1* | 10/2005 | Hoshino | 235/375 |
| 2005/0281641 A1* | 12/2005 | Maynard et al. | 414/273 |
| 2007/0284442 A1* | 12/2007 | Herskovitz | 235/383 |

* cited by examiner

*Primary Examiner* — Tuyen K Vo
(74) *Attorney, Agent, or Firm* — Eagle IP Limited; Jacqueline C. Lui (57) ABSTRACT

A precisely locating and address confirming method is provided. The method comprises: S1, a printing carrier is divided into several areas with equal interval, and the width of each area is set to be the same with the width of a shelf article depositing unit, and a main bar code containing article depositing position information is printed in the center of each area of the printing carrier; S2, the printing carrier is disposed on the shelf in such a way that each area corresponds to each shelf article depositing unit; S3, the article depositing position information contained in the main bar code is scanned and read when the scanning beam of a manipulator happens to be superposed with the main bar code of the area corresponding to the shelf article depositing unit so as to confirm the address of the article depositing position. The present solution is suitable for an automatic access system for single book, CD, or the similar articles with small size, and the horizontal direction and/or the vertical direction of the article access position is is rapidly, precisely located and the address is confirmed.

9 Claims, 8 Drawing Sheets

(Prior Art)

(Prior Art)

Fig. 12

PRECISELY LOCATING AND ADDRESS CONFIRMING METHOD

TECHNICAL FIELD

The present invention relates to a precisely locating and address confirming method for small size articles such as a single book, CD, etc. or similar articles.

BACKGROUND ART

In the present market, the automatic access system for books is mainly applied in the developed countries such as North America, Europe and Japan. However the applied automatic access system for books is not suitable for handling single book, but involves manually collecting and placing a number of books into boxes, before automatically depositing the boxes filled with books in the shelf by stockers. When a reader borrows books, all the books in the whole box need to be taken from the shelf by a stocker, then the required books are manually taken from such box and handed to the reader. This kind of automatic access system for books can not realize complete automation, in other words, it can not realize unmanned operation.

Figure 8:
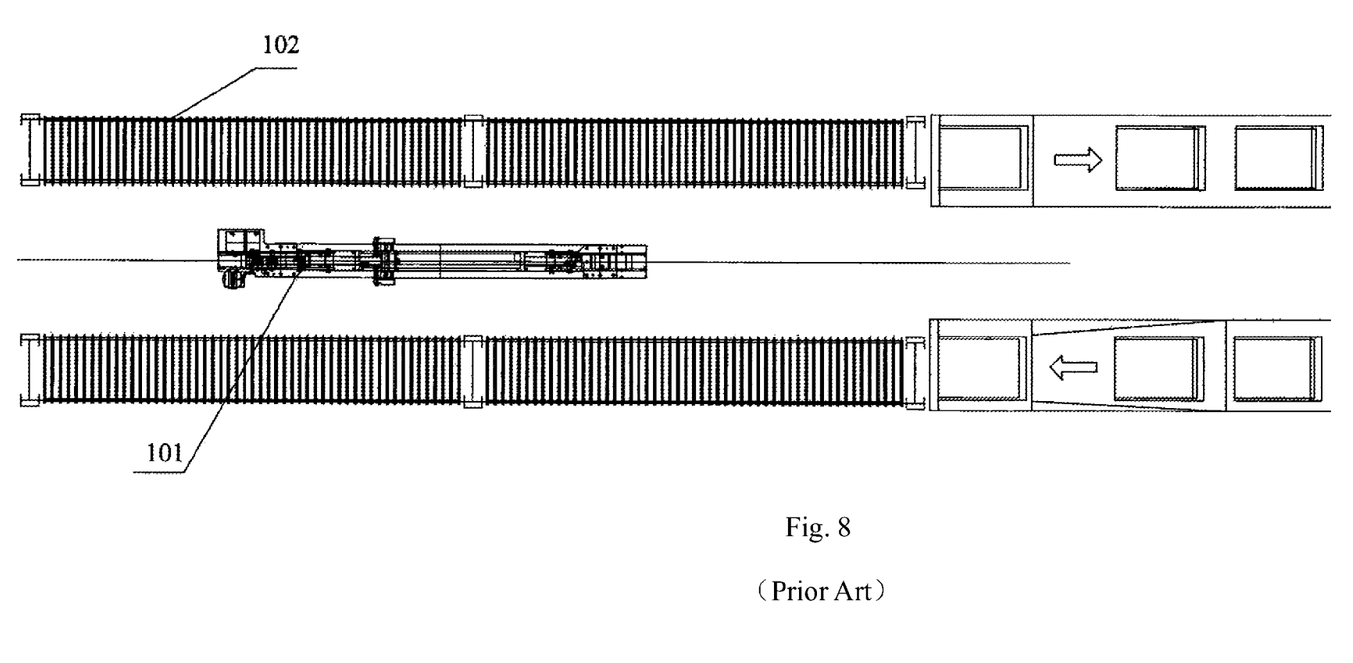
FIG. 8 is a top view of the access system for small size articles such as single book or CD, etc. which are applicable for the present invention.
Figure 11:
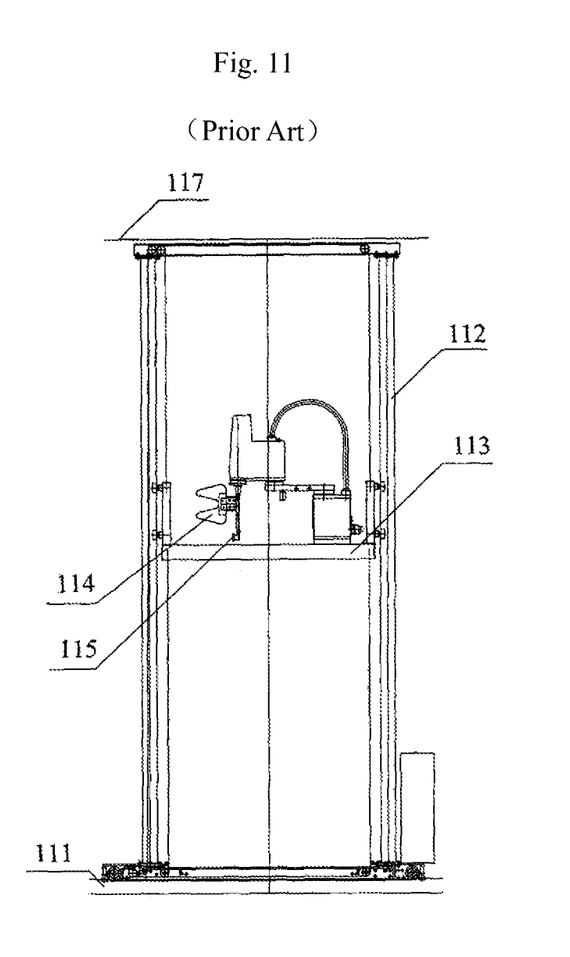
FIG. 11 is a schematic view of the structure of a stocker.

In the prior art, an access system suitable for small size articles such as a single book or CD, etc. is disclosed, such system is shown in FIG. 8, which mainly comprises shelves 102 and a stocker 101, with the stocker 101 arranged between two rows of shelves 102, a shelf 102 consists of beams 103, columns 104 and oblique bars, etc, article depositing units are disposed in the middle. FIG. 11 is a structural diagram of the stocker 101, the stocker 101 is arranged to slide between a ground rail 111 and a ceiling rail 117, which mainly consists of columns 112, a lifting table 113 sliding up and down on the columns 112 and a manipulator 114 disposed on the lifting table 113. When a stocker 101 operates to access the articles depositing in the shelf 102 upon receiving a command from an upper computer, the stocker 101 will first move to the front of the article depositing unit corresponding to the shelf 102 by sliding along the ground rail 111 and ceiling rail 117, an access to the articles will be completed by the protruding and retracting of the manipulator 114 relative to the lifting table 113. However, because of installation errors of the shelf 102, movement errors of the stocker 101, etc., the manipulator 114 on the stocker 101 could not move nicely to be right in front of the article depositing units of the shelf with respect to different conditions of access, thereby resulting in situations where the access can not be done quickly and effectively, or correctly.

CONTENTS OF THE INVENTION

The objective of the present invention is to provide a quick and effective method capable of precisely locating and address confirming for articles placed in the shelf, so as to overcome the above defects in the prior art.

In order to achieve the above mentioned objective, the present invention provides a precisely locating and address confirming method, comprising the following steps:

S1, a printing carrier is divided into several areas with equal interval, and the width of each area is set to be the same with the width of a shelf article depositing unit, and a main bar code containing article depositing position information is printed in the center of each area of the printing carrier;

S2, the printing carrier is disposed on the shelf in such a way that each area corresponds to each shelf article depositing unit;

S3, when a stocker moves to the front of a shelf article depositing unit to be accessed and the scanning beam of a manipulator disposed on the stocker happens to be superposed with the main bar code of the area corresponding to the shelf article depositing unit, the main bar code is scanned and the article depositing position information contained in the main bar code is read so as to confirm the address of the article depositing position;

S4, when a stocker moves to the front of a shelf article depositing unit to be accessed and the scanning beam of a manipulator disposed on the stocker is not superposed with the main bar code of the area corresponding to the shelf article depositing unit, it moves toward either the direction of such main bar code or the direction of the main bar code of an adjacent area according to a preset program, when a certain main bar code is scanned, the article depositing position information contained in the main bar code is read so as to confirm the address of the article depositing position.

A precisely locating and address confirming method is provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier, the width of the main bar code is set to be in accordance with the range of scale for locating precision in width direction, and larger than or equal to the width of the scanning beam of a manipulator, smaller than the length of the scanning beam of the manipulator;

S2, the printing carrier is disposed on the shelf in such a way that each area corresponds to each shelf article depositing unit;

S3, when a stocker moves to the front of a shelf article depositing unit to be accessed and the scanning beam of a manipulator disposed on the stocker is not superposed with the main bar code of the area corresponding to the shelf article depositing unit, it moves toward either the direction of such main bar code or the direction of the main bar code of an adjacent area according to a preset program, until superposing with a certain main bar code for precisely locating, when superposing with a certain main bar code, the article depositing position information contained in the main bar code is read so as to confirm the address of the article depositing position.

A precisely locating and address confirming method is provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier, an upper middle bar code containing relative position information corresponding to the main bar code is printed right above the main bar code, a lower middle bar code containing relative position information corresponding to the main bar code is printed right below the main bar code, the width of the main bar code is set to be in accordance with the range of scale for locating precision in width direction, and larger than or equal to the width of the scanning beam of a manipulator, the distance between the upper middle bar code and the lower middle bar code is set to be smaller than the length of the scanning beam of the manipulator, and the difference between the distance and the length is determined according to the range of scale for locating precision in length direction;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is only superposed with the upper middle bar code in the upper middle bar code and the lower middle bar code of the area corresponding to the shelf article depositing unit, it moves toward the right below direction according to the relative position information contained in such upper middle bar code, if the scanning beam of a manipulator disposed on the stocker is only superposed with the lower middle bar code in the upper middle bar code and the lower middle bar code of the area corresponding to the shelf article depositing unit, it moves toward the right above direction according to the relative position information contained in such lower middle bar code, until the scanning beam of the manipulator is superposed with the upper middle bar code, the main bar code and the lower middle bar code simultaneously for precisely locating, at this moment, the article depositing position information contained in the main bar code is read so as to confirm the address of the article depositing position.

A precisely locating and address confirming method is further provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

a left side bar code containing relative position information corresponding to the main bar code is printed on the left side of the main bar code, a right side bar code containing relative position information corresponding to the main bar code is printed on the right side of the main bar code, the width of the main bar code is set to be in accordance with the range of scale for locating precision in width direction, and larger than or equal to the width of the scanning beam of a manipulator, the length of the main bar code is set to be smaller than the length of the scanning beam of the manipulator;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is superposed with the left side bar code of the area corresponding to the shelf article depositing unit, it moves toward the right side according to the relative position information contained in such left bar code, if the scanning beam of a manipulator disposed on the stocker is superposed with the right side bar code of the area corresponding to the shelf article depositing unit, it moves toward the left side according to the relative position information contained in such right bar code, until the scanning beam of the manipulator is superposed with the main bar code for precisely locating, the article depositing position information contained in the main bar code is read to confirm the address of the article depositing position.

A precisely locating and address confirming method is further provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

a left side bar code containing relative position information corresponding to the main bar code is printed on the left side of the main bar code, a right side bar code containing relative position information corresponding to the main bar code is printed on the right side of the main bar code, on the left side of the main bar code, a left deceleration bar code containing deceleration information is printed adjacent to such main bar code, on the right side of the main bar code, a right deceleration bar code containing deceleration information is printed adjacent to such main bar code, the width of the main bar code is set to be in accordance with the range of scale for locating precision in width direction, and larger than or equal to the width of the scanning beam of a manipulator, the length of the main bar code is set to be smaller than the length of the scanning beam of the manipulator;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is superposed with the left side bar code of the area corresponding to the shelf article depositing unit, it moves toward the right side according to the relative position information contained in such left bar code, when the left deceleration bar code is scanned in the course of moving to the right side, it decelerates in movement according to the deceleration information contained in the left deceleration bar code, if the scanning beam of a manipulator disposed on the stocker is superposed with the right side bar code of the area corresponding to the shelf article depositing unit, it moves toward the left side according to the relative position information contained in such right bar code, when the right deceleration bar code is scanned in the course of moving to the left side, it decelerates in movement according to the deceleration information contained in the right deceleration bar code, until the scanning beam of the manipulator is superposed with the main bar code for precisely locating, the article depositing position information contained in the main bar code is read to confirm the address of the article depositing position.

A precisely locating and address confirming method is further provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

an upper middle bar code containing relative position information corresponding to the main bar code is printed right above the main bar code, a lower middle bar code containing relative position information corresponding to the main bar code is printed right below the main bar code, an upper left bar code and a lower left bar code which contain relative position information corresponding to the main bar code are respectively printed on the upper left side and lower left side of the main bar code, an upper right bar code and a lower right bar code which contain relative position information corresponding to the main bar code are respectively printed on the upper right side and lower right side of the main bar code, the width of the main bar code is set to be in accordance with the range of scale for locating precision in width direction, and larger than or equal to the width of the scanning beam of a manipulator, the distance between the upper left bar code and the lower left bar code or between the upper right bar code and the lower right bar code is set to be smaller than the length of the scanning beam of the manipulator, and the difference between the distance and the length is determined according to the range of scale for locating precision in length direction;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is only superposed with the upper left bar code or lower left bar code of the area corresponding to the shelf article depositing unit, it moves toward lower right or upper right according to the relative position information contained in such upper left bar code or lower left bar code, if the scanning beam of a manipulator disposed on the stocker is only superposed with the upper right bar code or lower right bar code of the area corresponding to the shelf article depositing unit, it moves toward lower left or upper left according to the relative position information contained in such upper right bar code or lower right bar code;

S4, if the scanning beam of a manipulator disposed on the stocker is only superposed with the upper middle bar code in the upper middle bar code and the lower middle bar code, it moves toward the right below direction according to the relative position information contained in such upper middle bar code, if the scanning beam of a manipulator disposed on the stocker is only superposed with the lower middle bar code in the upper middle bar code and the lower middle bar code, it moves toward the right above direction according to the relative position information contained in such lower middle bar code, until the scanning beam of a manipulator is superposed with the upper middle bar code, the main bar code and the lower middle bar code simultaneously for precisely locating, at this moment, the article depositing position information contained in the main bar code is read to confirm the address of the article depositing position.

A precisely locating and address confirming method is further provided, which comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

an upper middle bar code containing relative position information corresponding to the main bar code is printed right above the main bar code, a lower middle bar code containing relative position information corresponding to the main bar code is printed right below the main bar code, an upper left bar code and a lower left bar code which contain relative position information corresponding to the main bar code are respectively printed on the upper left side and lower left side of the main bar code, an upper right bar code and a lower right bar code which contain relative position information corresponding to the main bar code are respectively printed on the upper right side and lower right side of the main bar code, on the left side of the main bar code, between the upper left bar code and the lower left bar code, a left deceleration bar code containing deceleration information is printed adjacent to such main bar code, on the right side of the main bar code, between the upper right bar code and the lower right bar code, a right deceleration bar code containing deceleration information is printed adjacent to such main bar code, the width of the main bar code is set to be in accordance with the range of scale for locating precision in width direction, and larger than or equal to the width of the scanning beam of a manipulator, the distance between the upper left bar code and the lower left bar code or between the upper right bar code and the lower right bar code is set to be smaller than the length of the scanning beam of the manipulator, and the difference between the distance and the length is determined according to the range of scale for locating precision in length direction;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is only superposed with the upper left bar code or lower left bar code of the area corresponding to the shelf article depositing unit, it moves toward lower right or upper right according to the relative position information contained in such upper left bar code or lower left bar code, when the left deceleration bar code is scanned in the course of moving toward lower right or upper right, it decelerates in movement according to the deceleration information contained in the left deceleration bar code, if the scanning beam of a manipulator disposed on the stocker is only superposed with the upper right bar code or lower right bar code of the area corresponding to the shelf article depositing unit, it moves toward lower left or upper left according to the relative position information contained in such upper right bar code or lower right bar code, when the right deceleration bar code is scanned in the course of moving toward lower left or upper left, it decelerates in movement according to the deceleration information contained in the right deceleration bar code;

S4, if the scanning beam of a manipulator disposed on the stocker is only superposed with the upper middle bar code in the upper middle bar code and the lower middle bar code, it moves toward the right below direction according to the relative position information contained in such upper middle bar code, if the scanning beam of a manipulator disposed on the stocker is only superposed with the lower middle bar code in the upper middle bar code and the lower middle bar code, it moves toward the right above direction according to the relative position information contained in such lower middle bar code, until the scanning beam of a manipulator is superposed with the upper middle bar code, the main bar code and the lower middle bar code simultaneously for precisely locating, at this moment, the article depositing position information contained in the main bar code is read to confirm the address of the article depositing position.

Preferably, the bar code is consisted of one-dimensional or two-dimensional code.

Preferably, the printing carrier is arranged horizontally on the beam of the shelf, or is arranged vertically on the column of the shelf, or is arranged horizontally or vertically on the other corresponding part of the shelf.

MODES FOR CARRYING OUT THE INVENTION

The bar code to which the present invention refers can use one-dimensional code or two-dimensional code. However, only the usage of one-dimensional code is described in the following examples.

Figure 9:
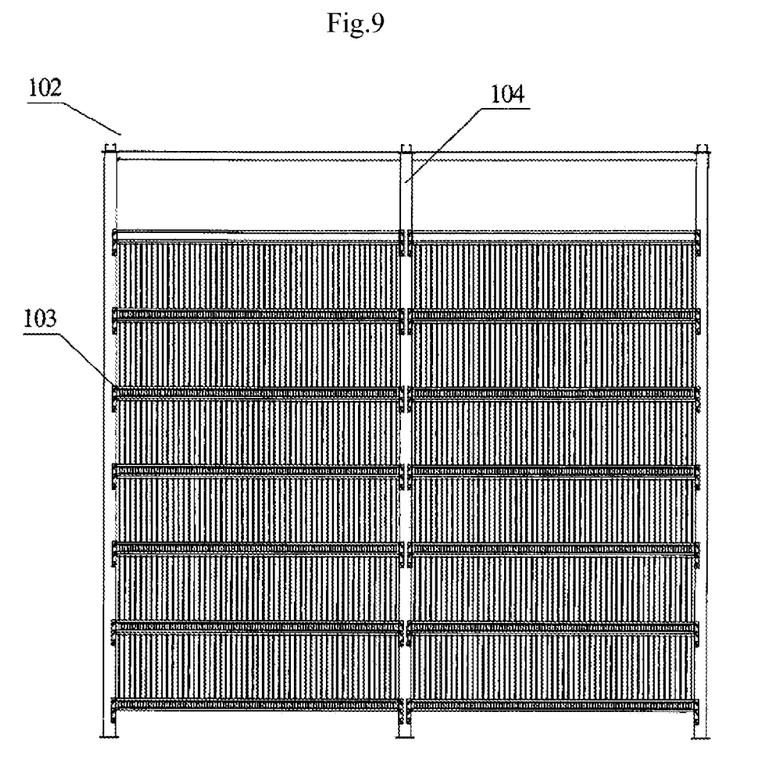
FIG. 9 is a front view of the shelf in FIG. 8.
Figure 10:
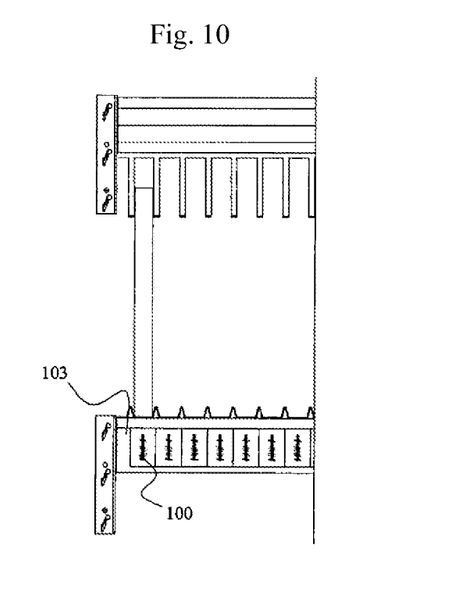
FIG. 10 is an enlarged schematic view of a certain layer of the shelf in FIG. 9.
Figure 12:
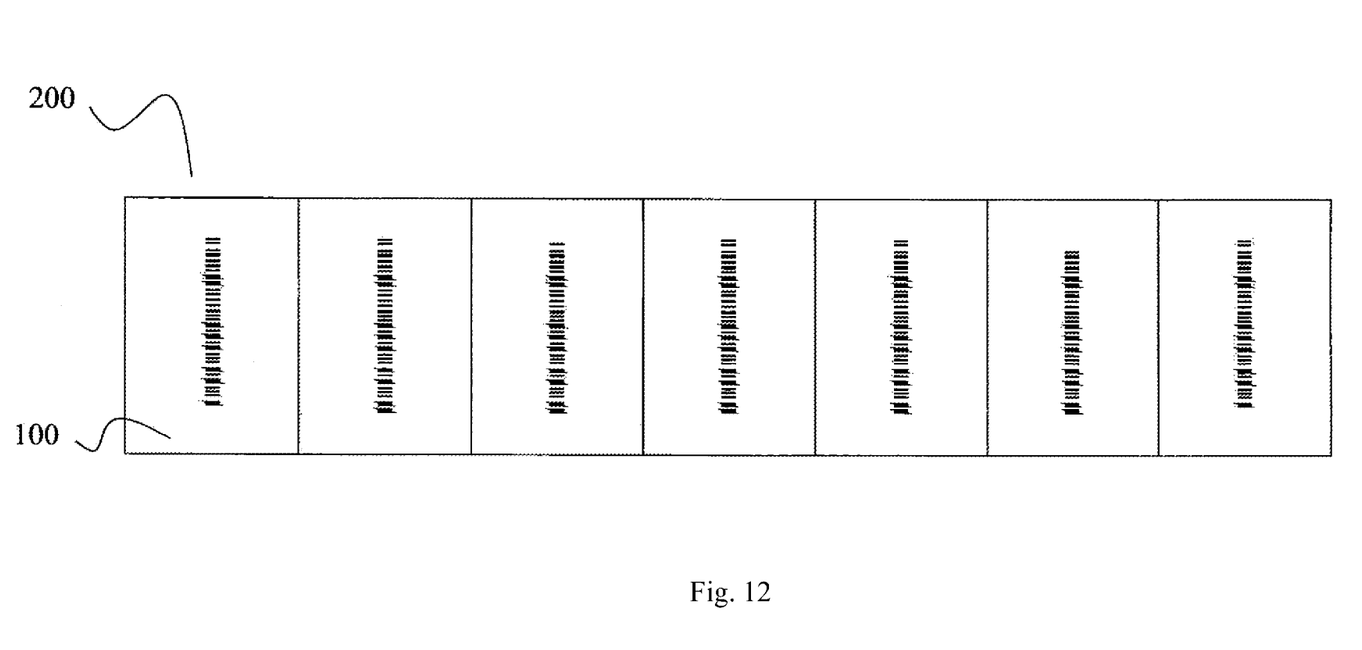
FIG. 12 is a schematic view of a printing carrier to which the present invention refers.

As shown in FIGS. 8, 9 and 10, the arrangement where a printing carrier 200 is arranged horizontally on a beam 103 of a shelf 102, i.e. the printing carrier 200 in FIG. 12 is arranged horizontally on the beam 103 of the shelf 102 in FIG. 10, to which the present invention refers, will be described below.

EXAMPLE 1

Figure 1A:
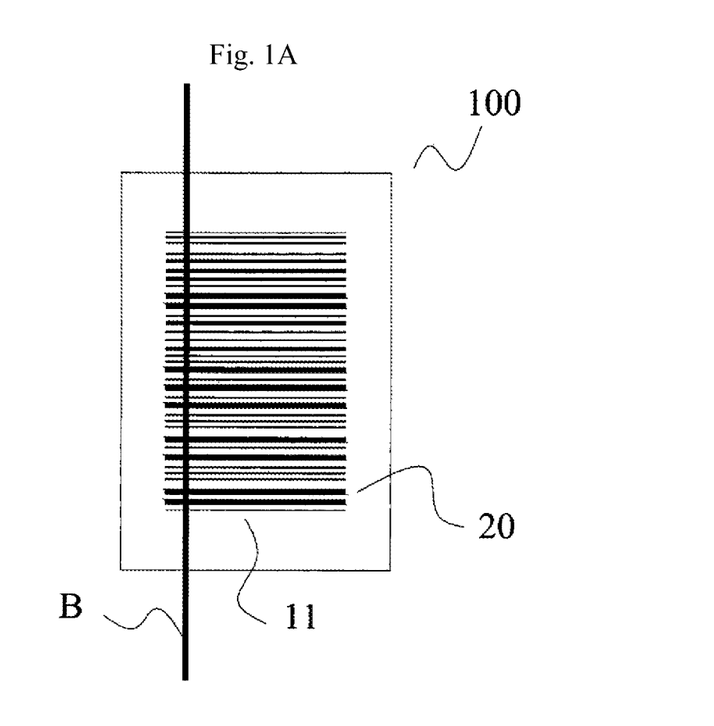
FIG. 1A and FIG. 1B are structural diagrams of areas of a printing carrier to which example 1 of the present invention refers.
Figure 1B:
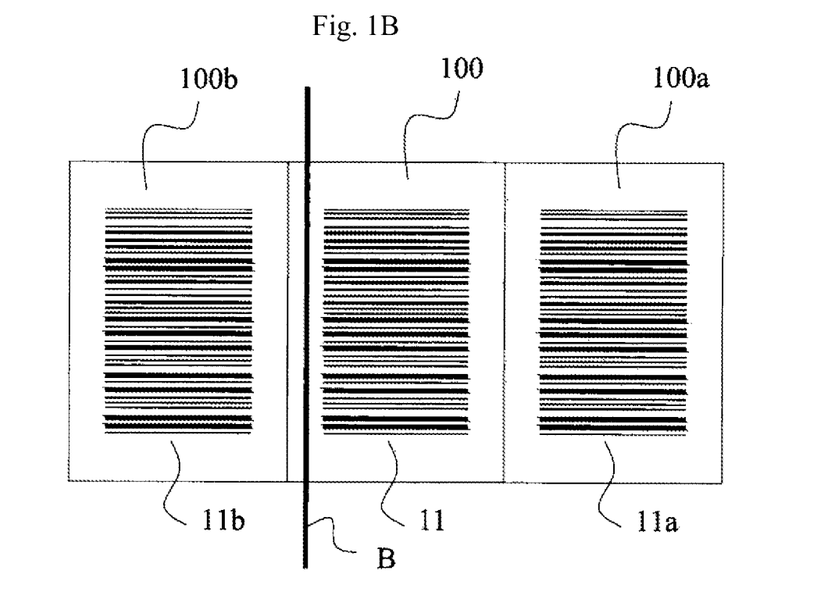

FIG. 1 is a structural diagram of an area 100 of a printing carrier 200 to which present example refers.

The precisely locating and address confirming method to which the present example refers comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200.

S2, the printing carrier 200 is deposited on the shelf 102 in such a way that each area 100 corresponds to each shelf article depositing unit.

S3, when a stocker 101 moves to the front of a shelf article depositing unit to be accessed and the scanning beam 115 of a manipulator disposed on the stocker 101 happens to be superposed with the main bar code of the area 100 corresponding to the shelf article depositing unit, the main bar code 11 is scanned and the article depositing position information contained in the main bar code 11 is read so as to confirm the address of the article depositing position (see FIG. 1A).

S4, when a stocker 101 moves to the front of a shelf article depositing unit to be accessed and the scanning beam 115 of a manipulator disposed on the stocker 101 is not superposed with the main bar code 11 of the area corresponding to the shelf article depositing unit, it moves toward the direction of such main bar code 11 or the direction of a main bar code 11b of another area 100b adjacent to such area 100 according to a preset program, when a certain main bar code is scanned, the article depositing position information contained in the main bar code is read so as to confirm the address of the article depositing position (see FIG. 1B).

The printing carrier 200 of the present example is applicable for use in the situation where only address confirming is needed.

EXAMPLE 2

Figure 2:
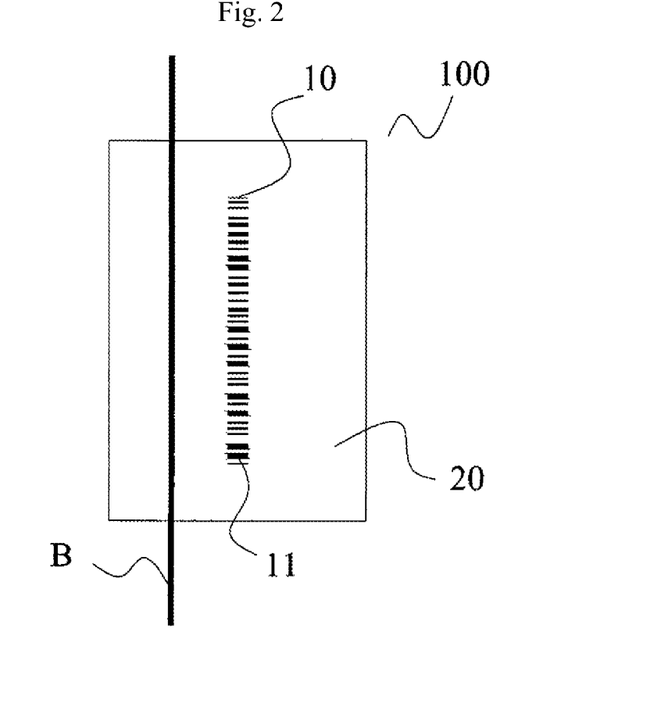
FIG. 2 is a structural diagram of areas of a printing carrier to which example 2 of the present invention refers.

FIG. 2 is a structural diagram of areas of a printing carrier to which example 2 of the present invention refers;

The precisely locating and address confirming method to which the present example refers comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200, the width of such main bar code 11 is set to be in accordance with the range of scale for locating precision in width direction, and larger than or equal to the width of the scanning beam 115 of a manipulator, the length of such main bar code 11 is set to be smaller than the length of the scanning beam of the manipulator.

Wherein, if the range of scale for locating precision in width direction is ±2 mm, the width of the main bar code 11 is set to be 4 mm, and if the range of scale for locating precision is ±3 mm, the width of the main bar code 11 is set to be 6 mm.

S2, the printing carrier 200 is disposed on the shelf 102 in such a way that each area 100 corresponds to each shelf article depositing unit.

S3, when a stocker 101 moves to the front of a shelf article depositing unit to be accessed and the scanning beam 115 of a manipulator disposed on the stocker 101 is not superposed with the main bar code 11 of the area 100 corresponding to the shelf article depositing unit, it moves toward the direction of such main bar code 11 or the direction of the main bar code of another area adjacent to such area 100 according to a preset program, until superposing with a certain main bar code for precisely locating, when superposing with a certain main bar code, the article depositing position information contained in the main bar code is read so as to confirm the address of the article depositing position.

The present example is applicable for the situation where the width of a shelf article depositing unit is narrow, and a quick, precise horizontal locating is needed.

EXAMPLE 3

Figure 3:
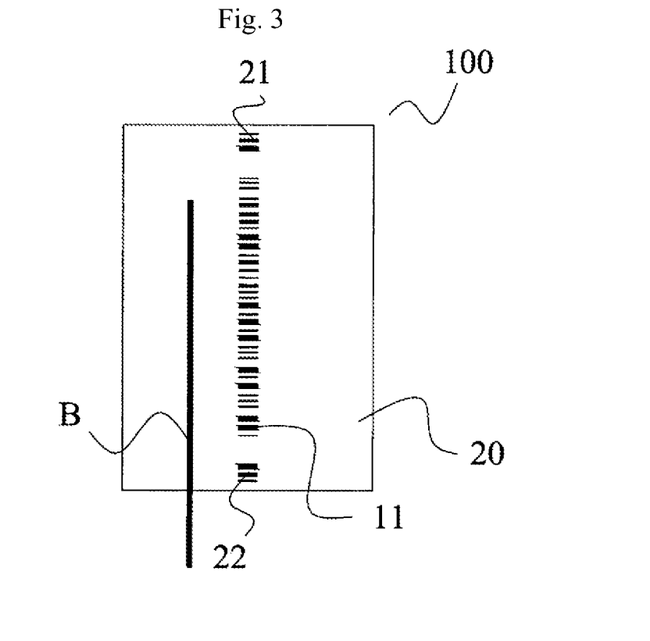
FIG. 3 is a structural diagram of areas of a printing carrier to which example 3 of the present invention refers.

FIG. 3 is a structural diagram of areas of a printing carrier to which example 3 of the present invention refers.

The precisely locating and address confirming method of the present example comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200;

an upper middle bar code 21 containing relative position information corresponding to such main bar code 11 is printed right above such main bar code 11;

a lower middle bar code 22 containing relative position information corresponding to such main bar code 11 is printed right below such main bar code 11;

the width of such main bar code 11 is set to be in accordance with the range of scale for locating precision in width direction, and larger than or equal to the width of the scanning beam 115 of a manipulator, the distance between the upper middle bar code 21 and lower middle bar code 22 is set to be smaller than the length of the scanning beam 115 of the manipulator, and the difference between the distance and the length is determined according to the range of scale for locating precision in length direction.

Wherein, if the range of scale for locating precision in width direction is ±2 mm, the width of the main bar code 11 is set to be 4 mm, and if the range of scale for locating precision is ±3 mm, the width of the main bar code 11 is set to be 6 mm.

Wherein, if the scanning beam 115 is a beam with fixed length, and the range of scale for locating precision in length direction is ±1 mm, the distance between the upper middle bar code 21 and the lower middle bar code 22 is a value obtained by the length of the scanning beam 115 minus 2 mm, and if the range of scale for locating precision in length direction is ±2 mm, the distance between the upper middle bar code 21 and the lower middle bar code 22 is a value obtained by the length of the scanning beam 115 minus 4 mm.

S2, the printing carrier 200 is disposed on the shelf 102 in such a way that each area 100 corresponds to each shelf article depositing unit.

S3, when a stocker 101 moves to the front of a shelf article depositing unit to be accessed, if the scanning beam 115 of a manipulator disposed on the stocker 101 is only superposed with the upper middle bar code 21 in the upper middle bar code 21 and the lower middle bar code 22 of the area 100 corresponding to the shelf article depositing unit, it moves toward the right below direction according to the relative position information contained in such upper middle bar code 21;

if the scanning beam 115 of a manipulator disposed on the stocker 101 is only superposed with the lower middle bar code 22 in the upper middle bar code 21 and the lower middle bar code 22 of the area 100 corresponding to the shelf article depositing unit, it moves toward the right above direction according to the relative position information contained in such lower middle bar code 22;

until the scanning beam 115 of a manipulator is superposed with the upper middle bar code 21, the main bar code 11 and the lower middle bar code 22 simultaneously for precisely locating, at this moment, the article depositing position information contained in such main bar code 11 is read so as to confirm the address of the article depositing position.

The present example is applicable for the situation where the width of a shelf article depositing unit is narrow, and a quick, precise locating in horizontal and height directions is needed.

EXAMPLE 4

Figure 4:
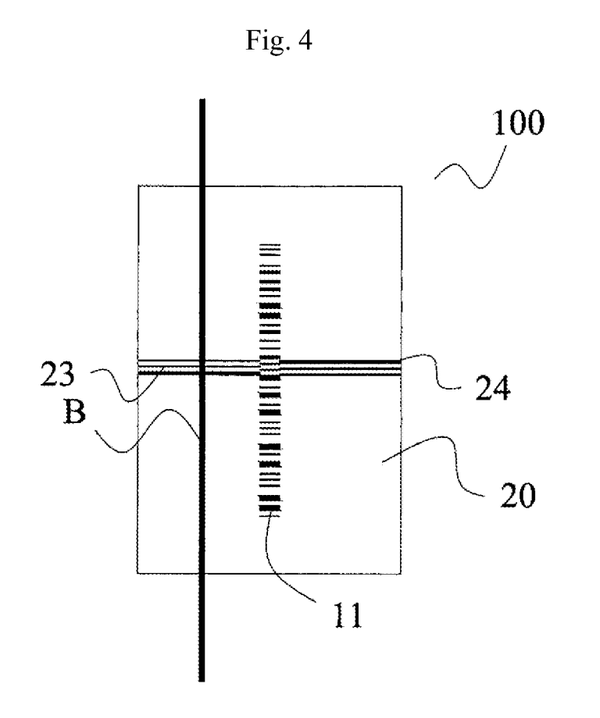
FIG. 4 is a structural diagram of areas of a printing carrier to which example 4 of the present invention refers.

FIG. 4 is a structural diagram of areas of a printing carrier referred to by example 4 of the present invention.

The precisely locating and address confirming method of the present example comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200;

a left side bar code 23 containing relative position information corresponding to such main bar code 11 is printed on the left side of such main bar code 11;

a right side bar code 24 containing relative position information corresponding to such main bar code 11 is printed on the right side of such main bar code 11;

the width of such main bar code 11 is set to be in accordance with the range of scale for locating precision in width direction, and larger than or equal to the width of the scanning beam 115 of a manipulator, the length of the main bar code 11 is set to be smaller than the length of the scanning beam of the manipulator.

Wherein, if the range of scale for locating precision in width direction is ±2 mm, the width of the main bar code 11 is set to be 4 mm, and if the range of scale for locating precision is ±3 mm, the width of the main bar code 11 is set to be 6 mm.

S2, the printing carrier 200 is disposed on the shelf 102 in such a way that each area 100 corresponds to each shelf article depositing unit;

S3, when a stocker 101 moves to the front of a shelf article depositing unit to be accessed, if the scanning beam 115 of a manipulator disposed on the stocker 101 is superposed with the left side bar code 23 of the area 100 corresponding to the shelf article depositing unit, it moves toward the right side according to the relative position information contained in such left bar code 23;

if the scanning beam 115 of a manipulator disposed on the stocker 101 is superposed with the right side bar code 24 of the area 100 corresponding to the shelf article depositing unit, it moves toward the left side according to the relative position information contained in such right bar code 24;

until the scanning beam 115 of a manipulator is superposed with the main bar code 11 for precisely locating, at this moment, the article depositing position information contained in such main bar code 11 is read to confirm the address of the article depositing position.

The present example is applicable for use in the situation where only a precise horizontal locating is needed.

EXAMPLE 5

Figure 5:
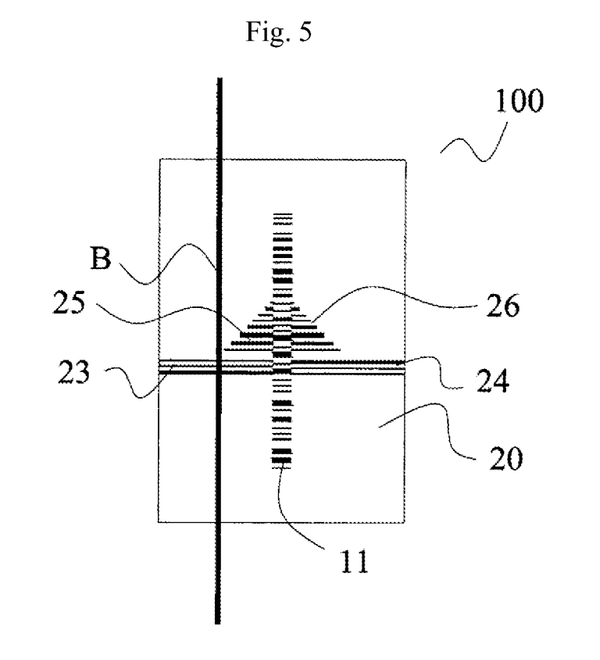
FIG. 5 is a structural diagram of areas of a printing carrier to which example 5 of the present invention refers.

FIG. 5 is a structural diagram of areas of a printing carrier to which example 5 of the present invention refers.

The precisely locating and address confirming method of the present example comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200;

a left side bar code 23 containing relative position information corresponding to such main bar code 11 is printed on the left side of such main bar code 11;

a right side bar code 24 containing relative position information corresponding to such main bar code 11 is printed on the right side of such main bar code 11;

on the left side of such main bar code 11, a left deceleration bar code 25 containing deceleration information is printed adjacent to such main bar code 11;

on the right side of such main bar code 11, a right deceleration bar code 26 containing deceleration information is printed adjacent to such main bar code 11;

the width of such main bar code 11 is set to be in accordance with the range of scale for locating precision in width direction, and larger than or equal to the width of the scanning beam 115 of a manipulator, the length of the main bar code 11 is set to be smaller than the length of the scanning beam of the manipulator.

Wherein, if the range of scale for locating precision in width direction is ±2 mm, the width of the main bar code 11 is set to be 4 mm, and if the range of scale for locating precision is ±3 mm, the width of the main bar code 11 is set to be 6 mm.

S2, the printing carrier 200 is disposed on the shelf 102 in such a way that each area 100 corresponds to each shelf article depositing unit;

S3, when a stocker 101 moves to the front of a shelf article depositing unit to be accessed, if the scanning beam 115 of a manipulator disposed on the stocker 101 is superposed with the left side bar code 23 of the area 100 corresponding to the shelf article depositing unit, it moves toward the right side according to the relative position information contained in such left bar code 23, when the left deceleration bar code 25 is scanned in the course of moving toward the right side, it decelerates in movement according to the deceleration information contained in the left deceleration bar code 25;

if the scanning beam 115 of a manipulator disposed on the stocker 101 is superposed with the right side bar code 24 of the area 100 corresponding to the shelf article depositing unit, it moves toward the left side according to the relative position information contained in such right bar code 24, when the right deceleration bar code 26 is scanned in the course of moving toward the left side, it decelerates in movement according to the deceleration information contained in the right deceleration bar code 26;

until the scanning beam 115 of a manipulator is superposed with the main bar code 11 for precisely locating, at this moment, the article depositing position information contained in such main bar code 11 is read to confirm the address of the article depositing position.

The present example is applicable for use in the situation where a quick, precise horizontal locating is needed.

EXAMPLE 6

Figure 6:
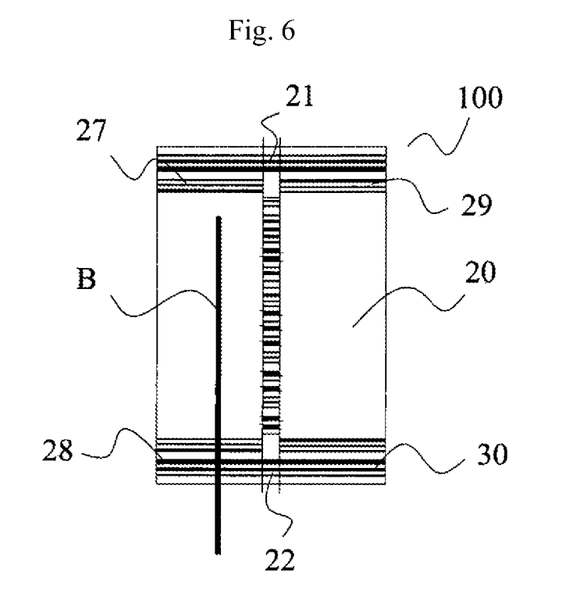
FIG. 6 is a structural diagram of areas of a printing carrier to which example 6 of the present invention refers.

FIG. 6 is a structural diagram of areas of a printing carrier to which example 6 of the present invention refers.

The precisely locating and address confirming method of the present example comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200;

an upper middle bar code 21 containing relative position information corresponding to such main bar code 11 is printed right above such main bar code 11;

a lower middle bar code 22 containing relative position information corresponding to such main bar code 11 is printed right below such main bar code 11;

an upper left bar code 27 and a lower left bar code 28 which contain relative position information corresponding to such main bar code 11 are respectively printed on the upper left side and lower left side of such main bar code 11;

an upper right bar code 29 and a lower right bar code 30 which contain relative position information corresponding to such main bar code 11 are respectively printed on the upper right side and lower right side of such main bar code 11;

the width of such main bar code 11 is set to be in accordance with the range of scale for locating precision in width direction, and larger than or equal to the width of the scanning beam 115 of a manipulator, the distance between the upper left bar code 27 and the lower left bar code 28 or between the upper right bar code 29 and the lower right bar code 30 is set to be smaller than the length of the scanning beam 115 of the manipulator, and the difference between the distance and the length is determined according to the range of scale for locating precision in length direction;

Wherein, if the range of scale for locating precision in width is ±2 mm, the width of the main bar code 11 is set to be 4 mm, and if the range of scale for locating precision is ±3 mm, the width of the main bar code 11 is set to be 6 mm.

Wherein, if the scanning beam 115 is a beam with fixed length, and the range of scale for locating precision in length direction is ±1 mm, the distance between the upper middle bar code 21 and the lower middle bar code 22 is a value obtained by the length of the scanning beam 115 minus 2 mm, and if the range of scale for locating precision in length direction is ±2 mm, the distance between the upper middle bar code 21 and the lower middle bar code 22 is a value obtained by the length of the scanning beam 115 minus 4 mm.

S2, the printing carrier 200 is disposed on the shelf 102 in such a way that each area 100 corresponds to each shelf article depositing unit;

S3, when a stocker 101 moves to the front of a shelf article depositing unit to be accessed, if the scanning beam 115 of a manipulator disposed on the stocker 101 is only superposed with the upper left bar code 27 or the lower left bar code 28 of the area 100 corresponding to the shelf article depositing unit, it moves toward lower right or upper right according to the relative position information contained in such upper left bar code 27 or lower left bar code 28;

if the scanning beam 115 of a manipulator disposed on the stocker 101 is only superposed with the upper right bar code 29 or the lower right bar code 30 of the area 100 corresponding to the shelf article depositing unit, it moves toward lower left or upper left according to the relative position information contained in such upper right bar code 29 or lower right bar code 30;

S4, if the scanning beam 115 of a manipulator disposed on the stocker 101 is only superposed with the upper middle bar code 21 of the upper middle bar code 21 and the lower middle bar code 22, it moves toward the right below direction according to the relative position information contained in such upper middle bar code 21;

if the scanning beam 115 of a manipulator disposed on the stocker 101 is only superposed with the lower middle bar code 22 of the upper middle bar code 21 and the lower middle bar code 22, it moves toward the right above direction according to the relative position information contained in such lower middle bar code 22;

until the scanning beam 115 of a manipulator is superposed with the upper middle bar code 21, the main bar code 11 and the lower middle bar code 22 simultaneously for precisely locating, at this moment, the article depositing position information contained in the main bar code 11 is read to confirm the address of the article depositing position.

The present example is applicable for the situation where a precise locating in horizontal direction and height direction is needed.

EXAMPLE 7

Figure 7:
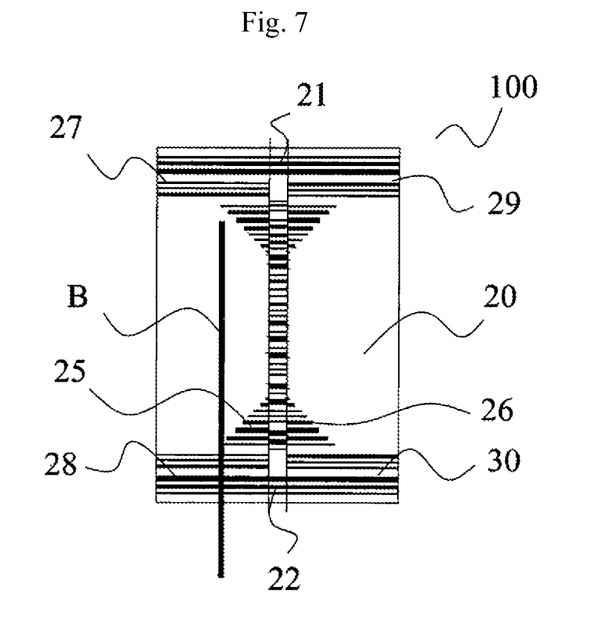
FIG. 7 is a structural diagram of areas of a printing carrier to which example 7 of the present invention refers.

FIG. 7 is a structural diagram of areas of a printing carrier to which example 7 of the present invention refers.

The precisely locating and address confirming method of the present example comprises the following steps:

S1, the printing carrier 200 is divided into several areas 100 with equal interval, and the width of each area 100 is set to be the same with the width of a shelf article depositing unit, and a main bar code 11 containing article depositing position information is printed in the center of each area 100 of the printing carrier 200;

an upper middle bar code 21 containing relative position information corresponding to such main bar code 11 is printed right above such main bar code 11;

a lower middle bar code 22 containing relative position information corresponding to such main bar code 11 is printed right below such main bar code 11;

an upper left bar code 27 and a lower left bar code 28 which contain relative position information corresponding to such main bar code 11 are respectively printed on the upper left side and lower left side of such main bar code 11;

an upper right bar code 29 and a lower right bar code 30 which contain relative position information corresponding to such main bar code 11 are respectively printed on the upper right side and lower right side of such main bar code 11;

on the left side of such main bar code 11, between the upper left bar code 27 and the lower left bar code 28, a left deceleration bar code 25 containing deceleration information is printed adjacent to such main bar code 11;

on the right side of such main bar code 11, between the upper right bar code 29 and the lower right bar code 30, a right deceleration bar code 26 containing deceleration information is printed adjacent to such main bar code 11;

the width of such main bar code 11 is set to be in accordance with the range of scale for locating precision in width direction, and larger than or equal to the width of the scanning beam 115 of a manipulator, the distance between the upper left bar code 27 and the lower left bar code 28 or between the upper right bar code 29 and the lower right bar code 30 is set to be smaller than the length of the scanning beam 115 of the manipulator, and the difference between the distance and the length is determined according to the range of scale for locating precision in length direction.

Wherein, if the range of scale for locating precision in width direction is ±2 mm, the width of the main bar code 11 is set to be 4 mm, and if the range of scale for locating precision is ±3 mm, the width of the main bar code 11 is set to be 6 mm.

Wherein, if the scanning beam 115 is a beam with fixed length, and the range of scale for locating precision in length direction is ±1 mm, the distance between the upper middle bar code 21 and the lower middle bar code 22 is a value obtained by the length of the scanning beam 115 minus 2 mm, and if the range of scale for locating precision in length direction is ±2 mm, the distance between the upper middle bar code 21 and the lower middle bar code 22 is a value obtained by the length of the scanning beam 115 minus 4 mm.

S2, the printing carrier 200 is disposed on the shelf 102 in such a way that each area 100 corresponds to each shelf article depositing unit;

S3, when a stocker 101 moves to the front of a shelf article depositing unit to be accessed, if the scanning beam 115 of a manipulator disposed on the stocker 101 is only superposed with the upper left bar code 27 or the lower left bar code 28 of the area 100 corresponding to the shelf article depositing unit, it moves toward lower right or upper right according to the relative position information contained in such upper left bar code 27 or lower left bar code 28, when the left deceleration bar code 25 is scanned in the course of moving toward lower right or upper right, it decelerates in movement according to the deceleration information contained in the left deceleration bar code 25;

if the scanning beam 115 of a manipulator disposed on the stocker 101 is only superposed with the upper right bar code 29 or the lower right bar code 30 of the area 100 corresponding to the shelf article depositing unit, it moves toward lower left or upper left according to the relative position information contained in such upper right bar code 29 or lower right bar code 30, when the right deceleration bar code 26 is scanned in the course of moving toward lower left or upper left, it decelerates in movement according to the deceleration information contained in the right deceleration bar code 26;

S4, if the scanning beam 115 of a manipulator disposed on the stocker 101 is only superposed with the upper middle bar code 21 of the upper middle bar code 21 and the lower middle bar code 22, it moves toward the right below direction according to the relative position information contained in such upper middle bar code 21;

if the scanning beam 115 of a manipulator disposed on the stocker 101 is only superposed with the lower middle bar code 22 of the upper middle bar code 21 and the lower middle bar code 22, it moves toward the right above direction according to the relative position information contained in such lower middle bar code 22;

until the scanning beam 115 of a manipulator is superposed with the upper middle bar code 21, the main bar code 11 and the lower middle bar code 22 simultaneously for precisely locating, at this moment, the article depositing position information contained in such main bar code 11 is read to confirm the address of the article depositing position.

The present example is applicable for the situation where quick, precise locating in both horizontal direction and height direction is needed.

Although the situation where the printing carrier 200 is arranged horizontally on the beam 103 of the shelf 102 has been described in the examples 1 to 7 hereinbefore, the above mentioned printing carrier 200 may also be arranged vertically on the column 104 of the shelf 102. When arranged on the column 104, the printing carrier 200 shown in FIG. 12 is arranged by rotating for 90°. Correspondingly, the scanning beam 115 which is completely synchronous with the manipulator 114 also rotates for 90° during scanning.

The above descriptions are optimal embodiments of the present invention. According to the disclosed contents of the present invention, a person skilled in the art may obviously conceive of several identical, substitutable solutions, all of which shall fall into the scope of protection of the present invention.

Industrial Applicability

The present solution is suitable for an automatic access system for single book, CD, or similar articles with small size, and the horizontal direction and/or the height direction of the article access position can be rapidly, precisely located and the address is confirmed so as to increase the overall working efficiency of the access system, and to reduce the rate of incorrect access.

The invention claimed is:

1. A precisely locating and address confirming method, characterized in that the method comprises the following steps:
S1, a printing carrier is divided into several areas with equal interval, and the width of each area is set to be the same with the width of a shelf article depositing unit, and a main bar code containing article depositing position information is printed in the center of each area of the printing carrier;
S2, the printing carrier is disposed on the shelf in such a way that each area corresponds to each shelf article depositing unit;
S3, when a stocker moves to the front of a shelf article depositing unit to be accessed and the scanning beam of a manipulator disposed on the stocker happens to be superposed with the main bar code of the area corresponding to the shelf article depositing unit, the main bar code is scanned and the article depositing position information contained in the main bar code is read so as to confirm the address of the article depositing position;
S4, when a stocker moves to the front of a shelf article depositing unit to be accessed and the scanning beam of a manipulator disposed on the stocker is not superposed with the main bar code of the area corresponding to the shelf article depositing unit, the scanning beam of the manipulator moves toward the direction of such main bar code or the direction of the main bar code of another area adjacent to such area according to a preset program, when a certain main bar code is scanned, the article depositing position information contained in the main bar code is read so as to confirm the address of the article depositing position.

2. A precisely locating and address confirming method, characterized in that the method comprises the following steps:
S1, a printing carrier is divided into several areas with equal interval, and the width of each area is set to be the same with the width of a shelf article depositing unit, and a main bar code containing article depositing position information is printed in the center of each area of the printing carrier, the width of the main bar code is set to be in accordance with the range of scale for locating precision in width direction, and larger than or equal to the width of the scanning beam of a manipulator, smaller than the length of the scanning beam of the manipulator;
S2, the printing carrier is disposed on the shelf in such a way that each area corresponds to each shelf article depositing unit;
S3, when a stocker moves to the front of a shelf article depositing unit to be accessed and the scanning beam of a manipulator disposed on the stocker is not superposed with the main bar code of the area corresponding to the shelf article depositing unit, the scanning beam of the manipulator moves toward the direction of such main bar code or the direction of the main bar code of another area adjacent to such area according to a preset program, until superposing with a certain main bar code for precisely locating, when superposing with a certain main bar code, the article depositing position information contained in the main bar code is read so as to confirm the address of the article depositing position.

3. A precisely locating and address confirming method, characterized in that the method it comprises the following steps:
S1, a printing carrier is divided into several areas with equal interval, and the width of each area is set to be the same with the width of a shelf article depositing unit, and a main bar code containing article depositing position information is printed in the center of each area of the printing carrier;
an upper middle bar code containing relative position information corresponding to the main bar code is printed right above the main bar code;
a lower middle bar code containing relative position information corresponding to the main bar code is printed right below the main bar code;
the width of the main bar code is set to be in accordance with the range of scale for locating precision in width direction, and larger than or equal to the width of the scanning beam of a manipulator, the distance between the upper middle bar code and the lower middle bar code is set to be smaller than the length of the scanning beam of the manipulator and the difference between the distance and the length is determined according to the range of scale for locating precision in length direction;
S2, the printing carrier is disposed on the shelf in such a way that each area corresponds to each shelf article depositing unit;
S3, when a stocker moves to the front of a shelf article depositing unit to be accessed,
if the scanning beam of a manipulator disposed on the stocker is only superposed with the upper middle bar code in the upper middle bar code and the lower middle bar code of the area corresponding to the shelf article depositing unit, the scanning beam of the manipulator moves toward the right below direction according to the relative position information contained in such upper middle bar code;
if the scanning beam of a manipulator disposed on the stocker is only superposed with the lower middle bar code in the upper middle bar code and the lower middle bar code of the area corresponding to the shelf article depositing unit, the scanning beam of the manipulator moves toward the right above direction according to the relative position information contained in such lower middle bar code;
until the scanning beam of a manipulator is superposed with the upper middle bar code, the main bar code and the lower middle bar code simultaneously for precisely locating, at this moment, the article depositing position information contained in the main bar code is read so as to confirm the address of the article depositing position.

4. A precisely locating and address confirming method, characterized in that the method comprises the following steps:
S1, a printing carrier is divided into several areas with equal interval, and the width of each area is set to be the same with the width of a shelf article depositing unit, and a main bar code containing article depositing position information is printed in the center of each area of the printing carrier;
a left side bar code containing relative position information corresponding to the main bar code is printed on the left side of the main bar code;

a right side bar code containing relative position information corresponding to the main bar code is printed on the right side of the main bar code;

the width of the main bar code is set to be in accordance with the range of scale for locating precision in width direction, and larger than or equal to the width of the scanning beam of a manipulator, the length of the main bar code is set to be smaller than the length of the scanning beam of the manipulator;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is superposed with the left side bar code of the area corresponding to the shelf article depositing unit, the scanning beam of the manipulator moves toward the right side according to the relative position information contained in such left bar code;

if the scanning beam of a manipulator disposed on the stocker is superposed with the right side bar code of the area corresponding to the shelf article depositing unit, the scanning beam of the manipulator moves toward the left side according to the relative position information contained in such right bar code;

until the scanning beam of a manipulator is superposed with the main bar code for precisely locating, at this moment, the article depositing position information contained in the main bar code is read to confirm the address of the article depositing position.

5. A precisely locating and address confirming method, characterized in that the method comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

a left side bar code containing relative position information corresponding to the main bar code is printed on the left side of the main bar code;

a right side bar code containing relative position information corresponding to the main bar code is printed on the right side of the main bar code;

on the left side of the main bar code, a left deceleration bar code containing deceleration information is printed adjacent to such main bar code;

on the right side of the main bar code, a right deceleration bar code containing deceleration information is printed adjacent to such main bar code;

the width of the main bar code is set to be in accordance with the range of scale for locating precision in width direction, and larger than or equal to the width of the scanning beam of a manipulator, the length of the main bar code is set to be smaller than the length of the scanning beam of the manipulator;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is superposed with the left side bar code of the area corresponding to the shelf article depositing unit, the scanning beam of the manipulator moves toward the right side according to the relative position information contained in such left bar code, when the left deceleration bar code is scanned in the course of moving toward the right side, it decelerates in movement according to the deceleration information contained in the left deceleration bar code;

if the scanning beam of a manipulator disposed on the stocker is superposed with the right side bar code of the area corresponding to the shelf article depositing unit, the scanning beam of the manipulator moves toward the left side according to the relative position information contained in such right bar code, when the right deceleration bar code is scanned in the course of moving toward the left side, it decelerates in movement according to the deceleration information contained in the right deceleration bar code;

until the scanning beam of a manipulator is superposed with the main bar code for precisely locating, at this moment, the article depositing position information contained in the main bar code is read to confirm the address of the article depositing position.

6. A precisely locating and address confirming method, characterized in that the method comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

an upper middle bar code containing relative position information corresponding to the main bar code is printed right above the main bar code;

a lower middle bar code containing relative position information corresponding to the main bar code is printed right below the main bar code;

an upper left bar code and a lower left bar code which contain relative position information corresponding to the main bar code are respectively printed on the upper left side and the lower left side of the main bar code;

an upper right bar code and a lower right bar code which contain relative position information corresponding to the main bar code are respectively printed on the upper right side and the lower right side of the main bar code;

the width of the main bar code is set to be in accordance with the range of scale for locating precision in width direction, and larger than or equal to the width of the scanning beam of a manipulator, the distance between the upper left bar code and the lower left bar code or between the upper right bar code and the lower right bar code is set to be smaller than the length of the scanning beam of the manipulator and the difference between the distance and the length is determined according to the range of scale for locating precision in length direction;

S2, the printing carrier is disposed to the shelf in such a way that each area corresponds to each shelf article depositing unit;

S3, when a stocker moves to the front of a shelf article depositing unit to be accessed, if the scanning beam of a manipulator disposed on the stocker is only superposed with the upper left bar code or the lower left bar code of the area corresponding to the shelf article depositing unit, the scanning beam of the manipulator moves toward lower right or upper right according to the relative position information contained in such upper left bar code or lower left bar code;

if the scanning beam of a manipulator disposed on the stocker is only superposed with the upper right bar code or the lower right bar code of the area corresponding to the shelf article depositing unit, the scanning beam of the manipulator moves toward lower left or upper left according to the relative position information contained in such upper right bar code or lower right bar code;

S4, if the scanning beam of a manipulator disposed on the stocker is only superposed with the upper middle bar code in the upper middle bar code and the lower middle bar code, the scanning beam of the manipulator moves toward the right below direction according to the relative position information contained in such upper middle bar code;

if the scanning beam of a manipulator disposed on the stocker is only superposed with the lower middle bar code in the upper middle bar code and the lower middle bar code, the scanning beam of the manipulator moves toward the right above direction according to the relative position information contained in such lower middle bar code;

until the scanning beam of a manipulator is superposed with the upper middle bar code, the main bar code and the lower middle bar code simultaneously for precisely locating, at this moment, the article depositing position information contained in the main bar code is read to confirm the address of the article depositing position.

7. A precisely locating and address confirming method, characterized in that the method comprises the following steps:

S1, a printing carrier is divided into several areas with equal interval, and the width of each area is set to be the same with the width of a shelf article depositing unit, and a main bar code containing article depositing position information is printed in the center of each area of the printing carrier;

an upper middle bar code containing relative position information corresponding to the main bar code is printed right above the main bar code;

a lower middle bar code containing relative position information corresponding to the main bar code is printed right below the main bar code;

an upper left bar code and a lower left bar code which contain relative position information corresponding to the main bar code are respectively printed on the upper left side and lower left side of the main bar code;

an upper right bar code and a lower right bar code which contain relative position information corresponding to the main bar code are respectively printed on the upper right side and lower right side of the main bar code;

on the left side of the main bar code, between the upper left bar code and the lower left bar code, a left deceleration bar code containing deceleration information is printed adjacent to such main bar code;

on the right side of the main bar code, between the upper right bar code and the lower right bar code, a right deceleration bar code containing deceleration information is printed adjacent to such main bar code;

the width of the main bar code is set to be in accordance with the range of scale for locating precision in width direction, and larger than or equal to the width of the scanning beam of a manipulator, the distance between the upper left bar code and the lower left bar code or between the upper right bar code and the lower right bar code is set to be smaller than the length of the scanning beam of the manipulator and the difference between the distance and the length is determined according to the range of scale for locating precision in length direction;

S2, the printing carrier is disposed on the shelf in such a way that each area corresponds to each shelf article depositing unit;

S3, when a stocker moves to the front of a shelf article depositing unit to be accessed, if the scanning beam of a manipulator disposed on the stocker is only superposed with the upper left bar code or the lower left bar code of the area corresponding to the shelf article depositing unit, the scanning beam of the manipulator moves toward lower right or upper right according to the relative position information contained in such upper left bar code or lower left bar code, when the left deceleration bar code is scanned in the course of moving toward lower right or upper right, it decelerates in movement according to the deceleration information contained in the left deceleration bar code;

if the scanning beam of a manipulator disposed on the stocker is only superposed with the upper right bar code or the lower right bar code of the area corresponding to the shelf article depositing unit, the scanning beam of the manipulator moves toward lower left or upper left according to the relative position information contained in such upper right bar code or lower right bar code, when the right deceleration bar code is scanned in the course of moving toward lower left or upper left, it decelerates in movement according to the deceleration information contained in the right deceleration bar code;

S4, if the scanning beam of a manipulator disposed on the stocker is only superposed with the upper middle bar code in the upper middle bar code and the lower middle bar code, the scanning beam of the manipulator moves toward the right below direction according to the relative position information contained in such upper middle bar code;

if the scanning beam of a manipulator disposed on the stocker is only superposed with the lower middle bar code in the upper middle bar code and the lower middle bar code, the scanning beam of the manipulator moves toward the right above direction according to the relative position information contained in such lower middle bar code;

until the scanning beam of a manipulator is superposed with the upper middle bar code, the main bar code and the lower middle bar code simultaneously for precisely locating, at this moment, the article depositing position information contained in the main bar code is read to confirm the address of the article depositing position.

8. The precisely locating and address confirming method according to any one of claims 1 to 7, characterized in that, the bar code consists of one-dimensional codes or two-dimensional codes.

9. The precisely locating and address confirming method according to any one of claims 1 to 7, characterized in that, the printing carrier is arranged horizontally on the beam of the shelf, or is arranged vertically on the column of the shelf, or is arranged horizontally or vertically on the other corresponding part of the shelf.

* * * * *